J. S. WEATHERS.
ANIMAL POKE.
APPLICATION FILED MAR. 14, 1917.
1,245,842. Patented Nov. 6, 1917.
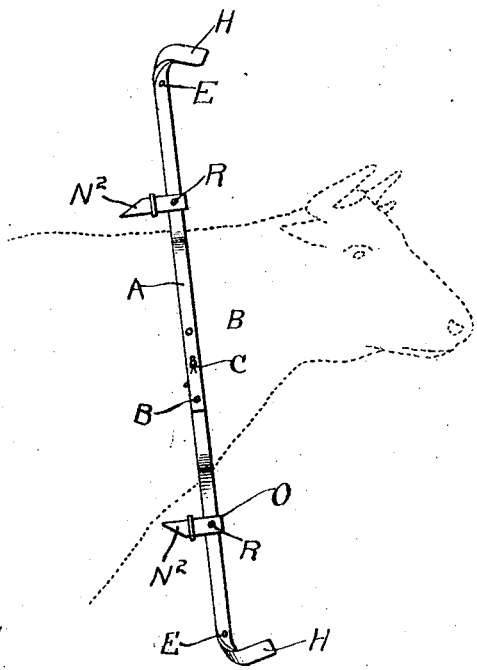
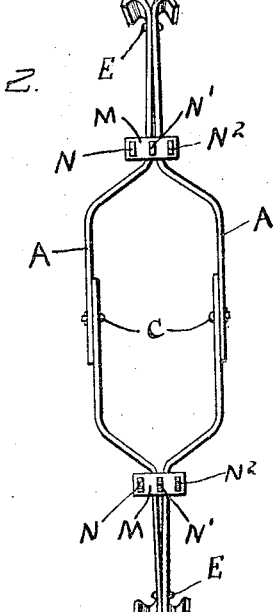
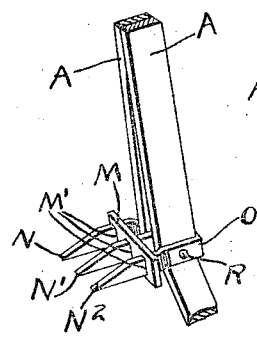
Inventor.
J. S. Weathers

UNITED STATES PATENT OFFICE.

JOSEPH S. WEATHERS, OF WINDSOR, MISSOURI.

ANIMAL-POKE.

1,245,842.

Specification of Letters Patent.

Patented Nov. 6, 1917.

Application filed March 14, 1917. Serial No. 154,730.

*To all whom it may concern:*

Be it known that I, JOSEPH S. WEATHERS, a citizen of the United States, residing at Windsor, in the county of Henry and State of Missouri, have invented certain new and useful Improvements in Animal-Pokes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in animal pokes and the object in view is to generally improve upon and render more efficient this type of invention. Heretofore in practice, it has been found that the spurs upon pokes of the general type to which my invention relates often bend and become noneffective in keeping animals from going through fences. To obviate this trouble, I have produced a poke having a spur reinforced by the brace and so arranged that the points may be held from bending and render the device effectual.

My invention is illustrated in the accompanying drawings, in which:—

Figure 1 is a side elevation.

Fig. 2 is a front view.

Fig. 3 is a perspective view showing the manner of bracing the spurs.

Reference now being had to the details of the drawings by letter, A, A designate two bars which are provided with apertures B in their adjacent ends, adapted to receive the pivotal pin C, forming means for adjusting the bars forming yokes for different sized animals. The shank portions of the yokes are held together by any suitable means as by rivets E. The ends of the bars are bent to form hooks H, H. Spurs are designated in the drawings by letters N, N' and N², said spurs N' and N² being made of a single piece of metal, bent as shown, having a clevis-shaped portion O adapted to engage over the two bars and apertured to receive the rivet R, passing also through the shank portion of the central spur N'. A bar M is provided with slots M' therein adapted to receive the several spurs and midway the length of the spurs and securely held upon the latter in any suitable way.

By the provision of a poke made in accordance with my invention, it will be noted that the spurs are reinforced and held from the usual bending incident to pokes made of the construction commonly in use.

What I claim to be new is:—

In an animal poke, an upper and a lower section adjustably connected together, a set of spurs carried by each section, each set of spurs comprising a strip of metal extending around the respective sections and having its ends pointed, an intermediate spur secured to each section and spaced from the remaining spurs, and a bar having openings adapted to receive the respective spurs intermediate of their length.

In testimony whereof I hereunto affix my signature in presence of two witnesses.

JOSEPH S. WEATHERS.

Witnesses:
W. W. MOFFETT,
T. G. HALL.

Copies of this patent may be obtained for five cents each, by addressing the "Commissioner of Patents, Washington, D. C."